April 13, 1943.  R. SKULINA  2,316,463
BIRD'S PULLEY LUNCH BOX
Filed March 12, 1941

Inventor
Raymond Skulina

Patented Apr. 13, 1943

2,316,463

UNITED STATES PATENT OFFICE 2,316,463

BIRD'S PULLEY LUNCH BOX

Raymond Skulina, Chicago, Ill.

Application March 12, 1941, Serial No. 382,928

2 Claims. (Cl. 119—51)

This invention relates to clothesline pulley tray for feeding the birds. It seems to me in summer time people think more about the birds than in winter. But in winter the birds are very neglected. Maybe lots of people would feed the birds in winter and summer if they had proper means to do it.

I believe the birds don't like to come too close to the window or a porch when the feed is put there for them, and to carry the feed to a distant place it is very inconvenient. A satisfactory distance can be reached with my clothesline pulley tray without leaving the house or walking in the snow, and yet the birds can have the feed on a nice clean tray at the distance they like. Almost every family is using a pulley clothesline to dry their clothes, whether they live on first, second, or third floor. From a window or a porch, the clothesline is stretched around two pulleys across the yard, from around one pulley to around another pulley that is fastened to a garage, post, or shed, then the ends are tied together.

The clothesline is movable all around the pulleys.

Figure 1:
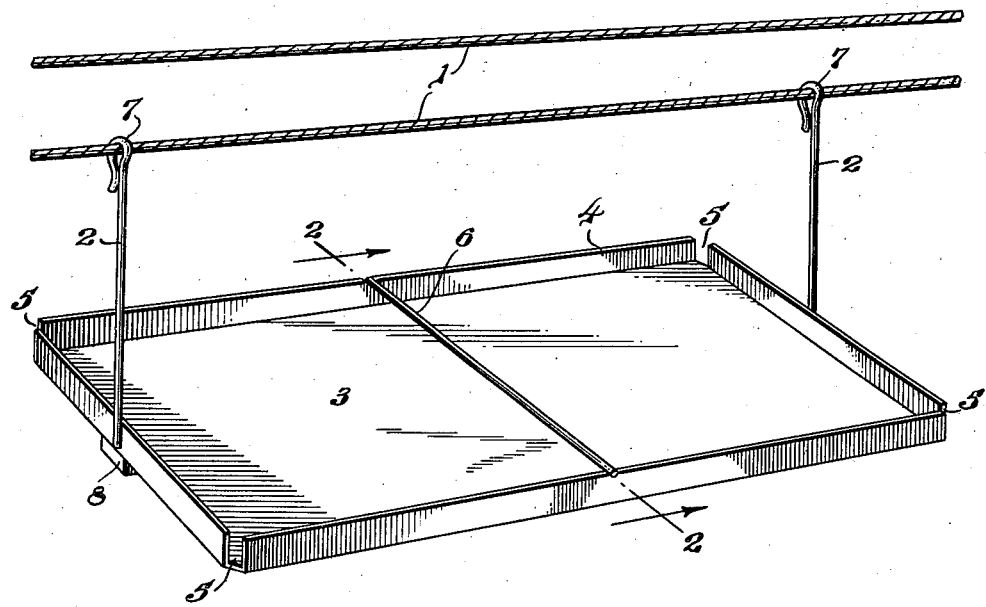
Figure 2:
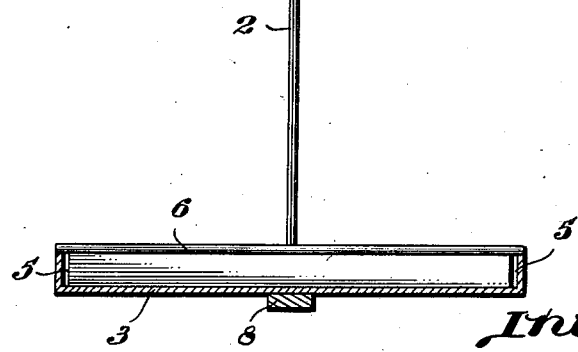

Fig. 1 is a perspective view of my device. Fig. 2 is a sectional view taken on the line 2—2 of Fig. 1.

By referring to the drawing:

I suspend my tray to the movable pulley line as indicated at Fig. 1, and at No. 1 I put the feed on, and move the tray by pulling the top pulley line or pushing the bottom line with the tray on the said pulley line. The tray can be put on top line or the bottom line and moved with the line. The feed may be put on while the tray is suspended from the pulley line as indicated at Fig. 1.

The tray also can be taken off for cleaning whenever needed. The tray when suspended from the pulley clothesline is moved in or out with the line same as wet clothes are hung on a pulley clothesline and moved with the line, and pulled in when dried. The sides of the tray are vertical as indicated at No. 4, and of the right height and proper thickness for the birds to sit on. I also have a perch across the tray as indicated at No. 6. The tray supporters as indicated at No. 2 are made from a wire, rod, or any suitable material. The tray supporters by the clothesline are bent to form a hook to hold on to the line and tight enough not to slip, as indicated at No. 7. The tray is made from cast iron sheet metal or any suitable material as indicated at No. 3. I use the weight as shown in the drawing at Fig. 2, at No. 8, only when the tray is made from a light material so that the wind will not blow the tray off the pulley line. A flexible wire can be used for a pulley rope as the wire will not stretch and shrink like the clothesline. On each corner of the tray are little openings as indicated at No. 5 to keep the rain water off the tray.

Having described in detail my invention, what I claim is:

1. In combination with a clothesline suspended to be longitudinally movable, a bird feeding tray including a bottom having sides thereon and also crossbar means on the sides enabling birds to perch thereon, a plurality of supporting wires extending upwardly from the tray and having each a hook at its upper end which engages tightly onto said line and constrains said tray to move with the line and prevents slipping thereon, apertures on the tray to drain liquid therefrom, and weight means provided on the bottom of the tray to prevent tilting thereof.

2. A bird feeding tray comprising a bottom adapted to receive bird seed and food thereon, sides extending upwardly from said bottom and also a crossbar on the sides, all adapted to have birds perch thereon, small apertures in the corners of said tray to drain rainwater therefrom but retain birdseed and food therein, a weight under said bottom for maintaining the tray in balance, and rods extending upwardly from opposite sides of the tray and each having its upper end arranged in the form of a hook adapted to engage tightly onto a clothesline so as to positively move along with said line and to be prevented from slipping thereon or falling off therefrom.

RAYMOND SKULINA.